United States Patent [19]

Hamano

[11] Patent Number: 4,788,567
[45] Date of Patent: Nov. 29, 1988

[54] OUTPUT INFORMATION SYSTEM FOR AN INTERCHANGEABLE LENS

[76] Inventor: Hideo Hamano, C-524, Dai-2 Koporasu, Kibougaoka, 144-1, Nakakibougaoka, Asahi-Ku, Kanagawa-Ken, Japan

[21] Appl. No.: 128,590

[22] Filed: Dec. 4, 1987

Related U.S. Application Data

[63] Continuation of Ser. No. 946,538, Dec. 24, 1986.

[30] Foreign Application Priority Data

Dec. 27, 1985 [JP] Japan .................. 60-292476

[51] Int. Cl.$^4$ .............................................. G03B 17/00
[52] U.S. Cl. .............................. 354/286; 354/289.12
[58] Field of Search ............... 354/286, 455, 195.1, 354/195.12, 289.12, 400, 410, 413

[56] References Cited

U.S. PATENT DOCUMENTS 4,149,795 4/1979 Sakruda et al. .................. 354/475
4,509,842 4/1985 Taniguchi et al. ............... 354/286

*Primary Examiner*—L. T. Hix
*Assistant Examiner*—David M. Gray
*Attorney, Agent, or Firm*—Bryan, Cave, McPheeters & McRoberts

[57] ABSTRACT

An output information system for an interchangeable lens (Y) usable with a microprocessor based camera system (X) for transmitting specific data about the lens (Y) to the microprocessor in the camera body (X) comprises a binary counter (CO) which counts each of n clock pulses transmitted from the microprocessor, and a discriminator gate array ($AN_1$ to $AN_6$, $AN_{11}$ to $AN_{15}$) connected to the counter (CO) for comparing the n clock pulse number which has a predetermined logic level among the specific data for producing the logic level as an output discriminated logic level via an output gate (OR, NOR) when the counted value of the counts (CO) is in agreement with the output discriminating condition of the gate array ($AN_1$ to $AN_6$, $AN_{11}$ to $AN_{15}$), the opposite logic level being provided as an output bit to the microprocessor when the counted value of the counter (CO) is not in agreement therewith. The data is then serially transmitted to the camera body (X) from the lens (Y), with the clock pulses also being serially sent to the lens (Y) from the camera body (X). The type of gate array ($AN_1$ to $AN_6$ or $AN_{11}$ to $AN_{15}$) is chosen based on whether the greater number of specific data bits are to be highs or lows.

5 Claims, 2 Drawing Sheets

OUTPUT INFORMATION SYSTEM FOR AN INTERCHANGEABLE LENS

CROSS-REFERENCE TO RELATED APPLICATION

This is a continuation, of U.S. Application Ser. No. 946,538, filed Dec. 24, 1986.

This application is related to the commonly owned U.S. patent application entitled "Camera Accessory Output Information System", naming Hideo Hamano as inventor thereof, filed Oct. 30, 1986 and bearing U.S. Ser. No. 925,706, now abandoned, the contents of which are specifically incorporated by reference herein in their entirety.

BACKGROUND OF THE INVENTION

1. Field of the Invention

The present invention relates to an output information system for providing specific data signals from an interchangeable lens to a camera body for use by a microprocessor in the camera body without the need for addressing, such as by using gate arrays.

2. Description of the Prior Art

Prior art camera systems employing microprocessors in the camera body which receive information from camera accessories, such as interchangeable lenses or stroboflash devices, for use by the microprocessor in controlling the operation of the camera are well known in the art such as, by way of example, described in British Patent No. 1,552,597; U.S. Pat. Nos. 4,509,842; 4,477,164 and 4,560,267; and Japanese Patent Publication Nos. 54-108628 and 59-84228. All of these prior art systems, however, employ an addressable read only memory or ROM located in the lens or accessory for storing the preset information to be sent to the microprocessor. Because of the use of a ROM, many inherent disadvantages are present in these prior art systems, such as an inherent lack of flexibility due to the fact that a ROM by its very nature is unique to a given microprocessor, has a data content which is inherently fixed, and is inherently discretized in its data storage. In addition, an address circuit must inherently be employed with such a prior art ROM based system whether the addressing is done by the camera body or ultimately by the accessory, since the ROM requires an address and a table look-up function in order to obtain the data stored at a particular fixed location in memory. Furthermore, a ROM inherently requires a long lead time in manufacture and is costly to produce. These disadvantages of the prior art ROM systems are overcome by the gate array based system of the present invention.

In addition to the aforementioned prior art ROM based systems, there have been prior art camera systems which employ simple switches to provide digital information to a microprocessor for use by the microprocessor, such as disclosed in U.S. Pat. Nos. 4,104,649; 4,426,147 and 3,428,858; however, none of these prior art systems is capable of readily providing the sophisticated information that the gate array based system of the present invention can while, thus, providing many of the benefits of ROM based systems without providing any of the disadvantages, operating in a totally different manner.

As disclosed in Japanese Patent Publication No. 54-108628 and U.S. Pat. No. 4,560,267, by way of example, clock pulses are sent from the camera body microprocessor to the lens in order to cause an address to be generated by the lens to obtain data fixedly stored in the ROM with the data then being sequentially output serially back to the microprocessor. In the present invention, although clock signals sent from the microprocessor are utilized and information is serially sent back to the microprocessor, there is no generation of addresses, nor is there any address function employed.

Another example of a prior art interchangeable lens of the type employed with a camera having a microprocessor in the camera body is disclosed in Japanese Patent Laid-Open No. 84228/1984, in which an interchangeable lens is provided with a ROM that fixedly stores various data and with a circuit that produces address data for the ROM, with the data fixedly stored in the ROM being produced according to the address. However, this prior art device also requires an address data output circuit for the ROM, thereby resulting in complex construction and increased manufacturing cost. Moreover, in such prior art systems, in order to reduce size, the ROM is constructed in the form of a masked ROM consuming extended periods of time for development and increased amount of expenses. Though a P-ROM can be developed consuming reduced periods of time, it imposes a problem of increase in the size. These disadvantages of the prior art are overcome by the present invention. Moreover, although these disadvantages are overcome by the gate array arrangement of the aforementioned U.S. patent application entitled "Camera Accessory Output Information System", the system disclosed therein normally requires a decoder in addition to a counter to control the gate array, whereas the present invention does not require any such decoder.

SUMMARY OF THE INVENTION

An output information system for providing data from an interchangeable lens to a camera body for use by a microprocessor in the camera body, includes a counter for counting the number of clock pulses sent from the camera body to the interchangeable lens in order to maintain synchronism in the electric operation between the interchangeable lens and the camera body, with the counted value of the counter being compared with a clock pulse number which has a "high" level among the specific data transmitted from the interchangeable lens to the camera body, a signal of the "high" level being produced when the counted value is discriminated to be in agreement therewith by a gate array associated with the counter. When the counted value is not in agreement, a signal of the "high" level is not produced but, rather, a signal of the "low" level is produced in order that the specific data of the interchangeable lens be transmitted one bit by one bit in series to the camera body in synchronism with the clock pulses.

DETAILED DESCRIPTION OF THE INVENTION

Figure 1:
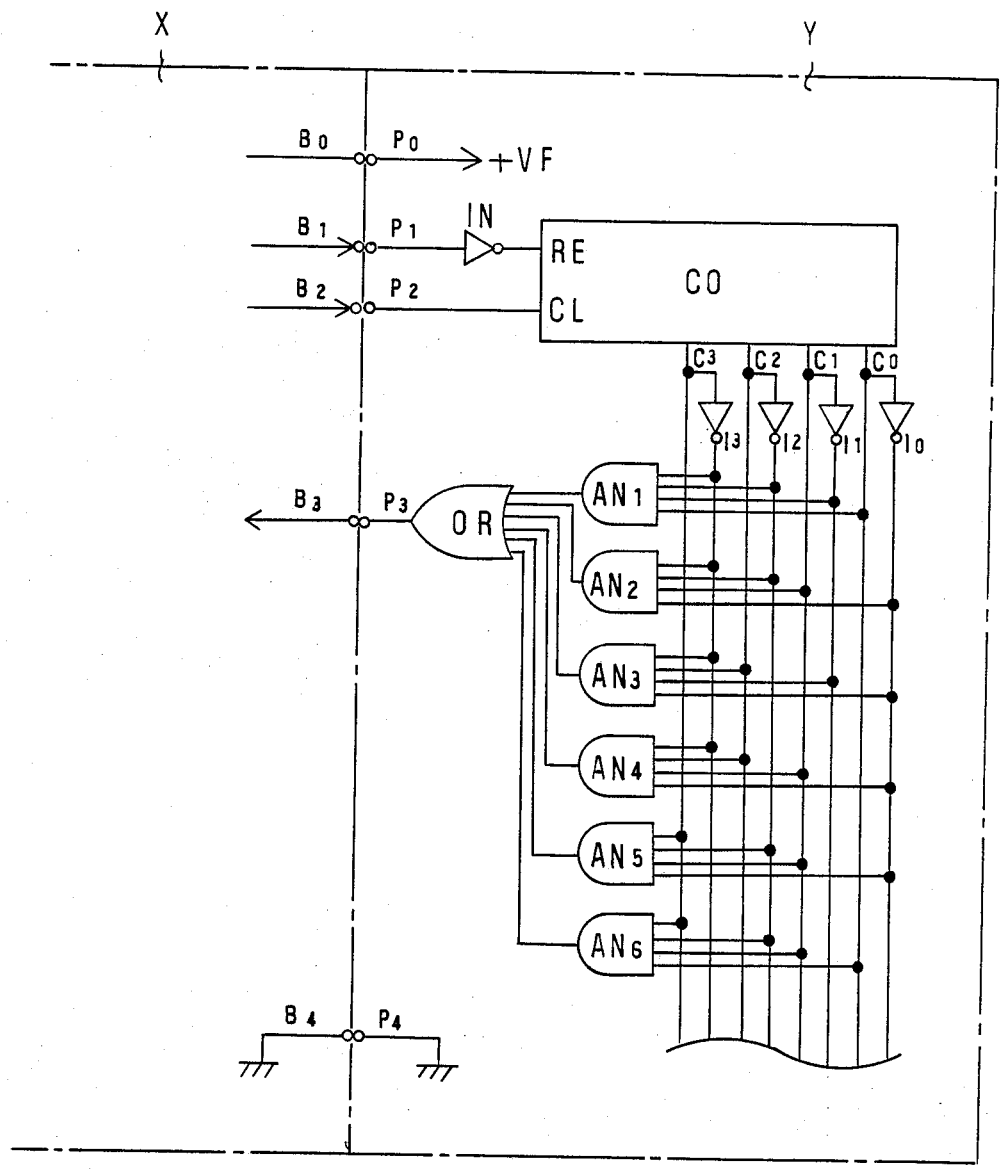
FIG. 1 is an illustrative simplified block diagram illustrating a preferred embodiment of the present invention showing a gate array based system in which the gate array discriminates a clock pulse number having a high value or level among the data transmitted from the lens to the camera body.

Referring now to the drawings in detail, and initially to FIG. 1 thereof, FIG. 1 shows a block diagram illustrating the data transmission of an interchangeable lens such as one of the autofocus type to which the present invention is adapted, with the left side of a dot-dash chain line representing the camera body (X) and the right side thereof representing the output information system disposed on the side of the interchangeable lens (Y).

A terminal ($B_0$) on the camera body (X) is preferably designated a power source output terminal which is connected to a corresponding power source input terminal ($P_0$) on the side of the interchangeable lens (Y). A terminal ($B_1$) on the side of the camera body (X) is preferably connected to a reset terminal (RE) of a counter (CO) in the lens (Y) via output terminal ($P_1$) and inverter (IN) located on the side of the interchangeable lens (Y).

The input terminal ($P_1$) preferably assumes a "high" level, or 1 in positive logic, all of the time when it is receiving the data transmitted from the interchangeable lens, and, thus, liberates the counter (CO) from the reset condition.

An output terminal ($B_2$) on the side of the camera body sends clock pulses to a terminal (CL) of the counter (CO) via an input terminal ($P_2$) so that synchronism is maintained in the electric operation between the interchangeable lens (Y) and the camera body (X).

The counter (CO) is preferably a binary counter of four bits $C_0$, $C_1$, $C_2$, $C_3$, and counts the rises of clock pulses received through the input terminal ($P_2$).

Outputs ($C_0$) to ($C_3$) of the four bits of the counter (CO) are preferably connected to AND gates ($AN_1$) to ($AN_6$) of an AND gate array either directly or via inverters ($I_0$) to ($I_3$) to provide a discriminator circuit for the counter (CO) as will be described in greater detail hereinafter. Outputs of the AND gates ($AN_1$) to ($AN_6$) are preferably connected to an output terminal ($P_3$) via an OR gate (OR), and are sent to an input terminal ($B_3$) on the side of the camera body (X).

The AND gates ($AN_1$) to ($AN_6$) of the gate array, which are connected to the outputs ($C_0$) to ($C_3$) of the four bits of the counter (CO), are set by a clock pulse number having a "high" level among the specific data transmitted from the interchangeable lens (Y) to the camera body (X). Table 1 below shows, by way of example, the connection of AND gates ($AN_1$) to ($AN_6$) in the discriminator gate arragy of FIG. 1, with these connections being illustrated below in Table 1, with "L" indicating a low level and "H" indicating a high level.

TABLE 1

| AND gate | Counter (CO) output | | | | Clock pulse number |
|---|---|---|---|---|---|
| | $C_3$ | $C_2$ | $C_1$ | $C_0$ | |
| $AN_1$ | L | L | L | H | 1 |
| $AN_2$ | L | L | H | L | 2 |
| $AN_3$ | L | H | L | L | 4 |
| $AN_4$ | L | H | H | L | 6 |
| $AN_5$ | H | L | H | L | 10 |
| $AN_6$ | H | L | H | H | 11 |

The AND gate ($AN_1$) preferably opens when the output terminals ($C_3$), ($C_2$) and ($C_1$) of the counter (CO) assume a low level "L, and the output terminal ($C_0$) assumes a high level "H". Similaryl, AND gate ($AN_2$) preferably opens when the output terminals ($C_3$) and ($C_2$) of the counter (CO) assume a low level "L", the terminal ($C_1$) assumes a high level "H" and the counter (CO) assumes the low level "L". As the counting of clock pulses sent from the camera body (X) proceeds, the counter (CO) preferably produces signals that are of the type illustrated below in Table 2 from its output terminals ($C_0$) to ($C_3$) for discrimination by the gate array AN1 to AN6.

TABLE 2

| Counted value | Counter (CO) output | | | |
|---|---|---|---|---|
| | $C_3$ | $C_2$ | $C_1$ | $C_0$ |
| 0 | L | L | L | L |
| 1 | L | L | L | H |
| 2 | L | L | H | L |
| 3 | L | L | H | H |
| 4 | L | H | L | L |
| 5 | L | H | L | H |
| 6 | L | H | H | L |
| 7 | L | H | H | H |
| 8 | H | L | L | L |
| 9 | H | L | L | H |
| 10 | H | L | H | L |
| 11 | H | L | H | H |
| 12 | H | H | L | L |
| 13 | H | H | L | H |
| 14 | H | H | H | L |
| 15 | H | H | H | H |

As the counted value of the counter (CO) increases by one, the output terminals ($C_3$), ($C_2$) and ($C_1$) assume a low level or 0 and the output terminal ($C_0$) assumes a high level or 1, assuming positive logic. This is in agreement with the output discriminating condition of the AND gate ($AN_1$) of the gate array ($AN_1$ to $AN_6$). THerefore, the AND gate ($AN_1$) is opened, and an output is transmitted as a "high" data signal or 1 to the camera body (X) via the output OR gate (OR). As the counted value proceeds to 2, the condition is now in agreement with the output discriminating condition of the AND gate ($AN_2$) of the gate array ($AN_1$ to $AN_6$); i.e., the gate ($AN_2$) is opened to transmit an output as a "high" data signal or 1. The counted value then proceeds to 3. In this case, however the condition is in agreement with none of the output discriminating conditions of the AND gates ($AN_1$) to ($AN_6$) comprising the gate array, and no gate is opened. Therefore, an output is transmitted as a "low" data signal or 0 to the camera body (X) via the output OR gate (OR). As the counter proceeds, further, the output signals are produced one bit by one bit, successively.

Figure 2:
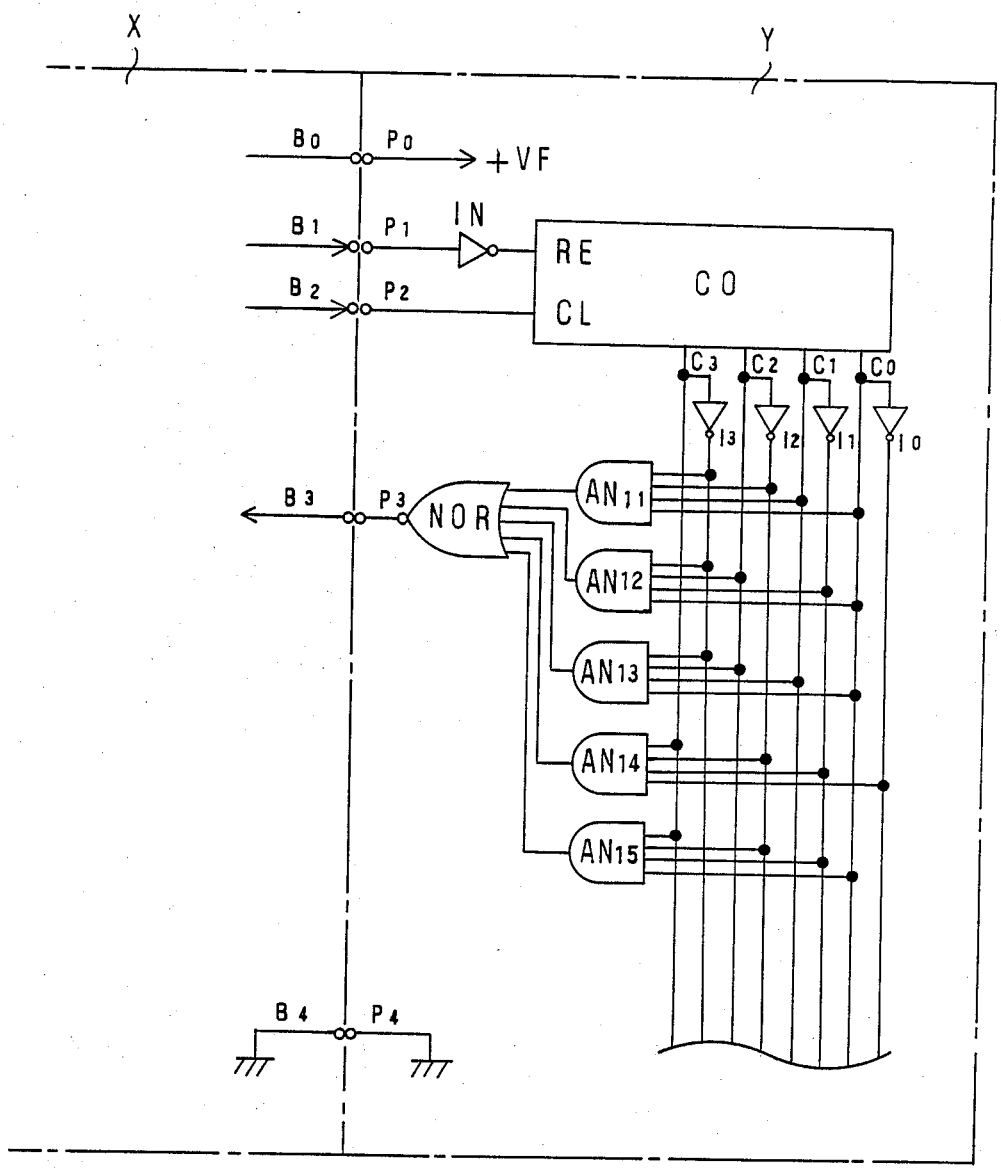
FIG. 2 is a block diagram, similar to FIG. 2, of an alternative embodiment in which the gate array discriminates a clock pulse number having a low value or level among the data transmitted from the lens to the camera body.

As is apparent from the above description, in the embodiment of FIG. 1, provision was made to discriminate a clock pulse number having a high level or 1 among the specific data transmitted from the interchangeable lens (Y) to the camera body (X) using gate array $AN_1$ to $AN_6$. However, it is also allowable to provide a gate array $AN_{11}$ to $AN_{15}$ which discriminates a clock pulse number having a low level or 0 among the specific data transmitted from the interchangeable lens (Y) to the camera body (X), such as shown in FIG. 2, in order to realize the same data output system as previously described with reference to FIG. 1. AND girates ($AN_{11}$) to ($AN_{15}$) of the gate array comprising the discrimination circuit of FIG. 2, are connected to output terminals ($C_0$) to ($C_3$) of the four bits of the counter (CO) and are preferably set by a clock pulse number of a low level or 0 among the specific data transmitted from the interchangeable lens (Y) to the camera body (X). Table 3 illustrates, by way of example, the connection of AND gates ($AN_{11}$) to ($AN_{15}$) of the discriminator circuit of FIG. 2, with "L" again representing a low level or 0 and "H" again representing a high level or 1.

TABLE 3

| AND gate | Counter (CO) output | | | | Clock pulse number |
|---|---|---|---|---|---|
| | $C_3$ | $C_2$ | $C_1$ | $C_0$ | |
| $AN_{11}$ | L | L | H | H | 3 |
| $AN_{12}$ | L | H | L | H | 5 |
| $AN_{13}$ | L | H | H | H | 7 |
| $AN_{14}$ | H | L | L | L | 8 |
| $AN_{15}$ | H | L | L | H | 9 |

The counted value of the counter (CO) proceeds to 1 and then to 2. These counted values, however, in the embodiment of FIG. 2, are not in agreement with the output discriminating conditions of the AND gates ($AN_{11}$) to ($AN_{15}$) of the gate array, and no gate is opened. Therefore, an output is transmitted as a "high" data signal or 1 to the camera body (X) via an output NOR gate (NOR). Then, as the counted value of the counter (CO) proceeds to 3, the output terminals ($C_3$) and ($C_2$) assume a low level and the output terminals ($C_1$) and (CO) assume a high level. Here, the condition is in agreement with the output discriminating condition of the AND gate ($AN_{11}$) of the gate array; i.e., the gate is opened and an output is transmitted as a "low" data signal or 0 to the camera body (X) via the output NOR gate (NOR). As the counter (CO) proceeds further, the signals are produced one bit by one bit, successively.

Whether the discriminating circuit, which is preferably comprised of an AND gate array, should discriminate a clock pulse number of a high level or 1 or should discriminate a clock pulse number of a low level or 0, is preferably decided based on an examination of the specific data of the interchangeable lens (Y). If the number of "high" signals or 1's is small, the discriminator circuit is then preferably constituted so as to discriminate a clock pulse number of the high level or 1, such as the discriminator circuit of FIG. 1. If, however, the number of "low" signals in the specific data of the lens (Y) is small, the discriminator circuit is preferably constituted so as to discriminate a clock pulse number of the low level, such as the discriminator circuit of FIG. 2, so that the discriminating circuit can be most simply constructed.

Summarizing the above, according to the present invention, the number of clock pulses from the camera body (X) is counted by a counter (CO) on the side of the interchangeable lens (Y), the counted value of the counter (CO) is compared with a clock pulse number having a high level (FIG. 1) or low level (FIG. 2) among the specific data that is transmitted from the interchangeable lens (Y) to the camera body (X), and the specific data are then transmitted to the camera body (X). Therefore, there is no need of providing a number of output signal lines to indicate the data storage positions of the interchangeable lens (Y) sent from the camera body (X) such as with a ROM, making it possible to minimize the signal lines between the camera body (X) and the interchangeable lens (Y) and to minimize the electric contacts, while contributing to increase the reliability and to decrease the manufacturing cost of the lens (Y).

Since the discrimination circuit of the present invention does not produce the fixed memory data of a ROM, there is no need to provide an address data output circuit for a ROM, and the circuit structure can, thus, be simplified and the manufacturing cost can be decreased.

According to the present invention, there may be provided a circuit, such as shown in FIG. 1, which compares and discriminates only those clock pulse numbers that have a high level or 1 among the specific data of the interchangeable lens (Y). When the number of signals having the low level is small, on the other hand, there may be provided a circuit, such as shown in FIG. 2, which compares and discriminates only those clock pulse numbers that have a low level or 0, to further simplify the circuit structure and to decrease the manufacturing cost.

Moreover, the device according to the present invention can be constituted relying upon logic circuits only without using fixed memory elements such as a ROM. Therefore, if constituted by using gate array integrated circuit elements, the device can be realized in a small size and is a reduced weight.

What is claimed is:

1. An output information system for an interchangeable lens usable with a microprocessor based camera system for transmitting specific defined logic data about said lens to said microprocessor for use by said microprocessor in controlling the operation of the camera to which said lens is interchangeably attached, said microporcessor being in the camera body, said microprocessor providing a clock pulse stream of n pulse in length to said interchangeable lens; said interchangeable lens consisting of counter means for counting each of said n clock pulses transmitted from said microprocessor in a specifictiming sequence, a discriminator condition responsive AND gate array circuit configuration having a plurality of output discriminating conditions providable at the output thereof and having the inputs thereof operatively connected to said counter means output, said output discriminating conditions being dependent on said counter ouput for calculating an output for said AND gate array based on said circuit configuration and enabling said AND gate array for providing a predetermined common logic level output signal, said counter output being dependent on said n clock pulse number in said specific timing sequence, said counter output being compared with the output discriminating condition of said AND gate array circuit configuration at a given clock pulse in said specific timing sequence for producing said predetermined common logic level as an output discriminated logic level serial bit from said AND gate array circuit configuration when the counted value of said counter means is in agreement with the output discrimination conditions of said AND gate array circuit configuration corresponding to said specific defined logic data, the opposite logic level to said predetermined common logic level being provided as said output serial bit from said AND gate array circuit configuration when said counted value of said counter means is not in agreement with said ND gate array circuit configuration output discrimination conditions and a disjunctive logic output gate configuration operatively connected to said AND gate array circuit configuration output for providing said output serial bit to said microprocessor from said lens output information system, said specific defined logic data being serially transmitted from said lens output information system bit by bit to said camera body for controlling the operation of said camera without retrievable storage of said lens data in said camera system.

2. An output information system in accordance with claim 1 wherein said specific defined logic data comprises a greater number of high logic level signals, said disjunctive logic output gate configruation comprising an OR output gate having its input operatively connected to said AND gate array circuit configuration output said predetermined common logic level being a high logic level, said opposite logic level being a low logic level.

3. An output information system in accordance with claim 2 wherein said counter comprises a 4 bit binary counter.

4. An output information system in accordance with claim 1 wherein said specific defined logic data comprises a greater number of low logic level signals, said disjunctive logic output gate configuration comprising a NOR output gate having its input operatively connected to said AND gate array circuit configuration output said predetermined common logic level being a low logic level, said opposite logic level being a high logic level.

5. An output information system in accordance with claim 4 wherein said counter comprises a 4 bit binary counter.

* * * * *